United States Patent
Thayer et al.

(10) Patent No.: US 6,187,834 B1
(45) Date of Patent: Feb. 13, 2001

(54) RADIATION CURABLE SILICONE COMPOSITIONS

(75) Inventors: Leroy Elton Thayer, Midland; James Steven Tonge, Sanford; Gary Allen Vincent, Midland, all of MI (US)

(73) Assignee: Dow Corning Corporation, Midland, MI (US)

( * ) Notice: Under 35 U.S.C. 154(b), the term of this patent shall be extended for 0 days.

(21) Appl. No.: 09/392,037

(22) Filed: Sep. 8, 1999

(51) Int. Cl.$^7$ .......................... C08G 77/08; C08G 77/16; C08G 77/20; C08J 3/28; C08F 2/50
(52) U.S. Cl. ................................. 522/15; 522/31; 522/85; 522/86; 522/99; 522/148; 524/837; 528/14; 528/15; 528/17; 528/20; 528/29; 528/32; 528/34; 528/40
(58) Field of Search ................... 522/99, 15, 25, 522/84, 85, 86, 148; 524/837; 528/14, 15, 17, 20, 29, 32, 34, 40

(56) References Cited

U.S. PATENT DOCUMENTS

| | | | |
|---|---|---|---|
| 4,279,717 | 7/1981 | Eckberg et al. | 204/159.13 |
| 4,313,988 | 2/1982 | Koshar et al. | 428/40 |
| 4,421,904 | 12/1983 | Eckberg et al. | 528/27 |
| 4,822,687 | 4/1989 | Kessel et al. | 428/447 |
| 4,987,158 | 1/1991 | Eckberg | 522/31 |
| 5,158,991 | 10/1992 | Riding | 522/170 |
| 5,198,476 | 3/1993 | Kobayashi et al. | 522/31 |
| 5,302,671 | * 4/1994 | Cifuentes et al. . | |
| 5,310,601 | 5/1994 | Riding | 428/429 |
| 5,331,020 | * 7/1994 | Brown et al. . | |
| 5,360,833 | 11/1994 | Eckberg et al. | 522/31 |
| 5,369,205 | 11/1994 | Eckberg et al. | 528/25 |
| 5,397,813 | 3/1995 | Eckberg et al. | 522/31 |
| 5,449,716 | * 9/1995 | Liles et al. . | |
| 5,498,642 | * 3/1996 | Chu et al. . | |
| 5,594,042 | * 1/1997 | Glover et al. . | |
| 5,629,095 | * 5/1997 | Bujanowski et al. . | |

FOREIGN PATENT DOCUMENTS

| | | | |
|---|---|---|---|
| 582 922 | 7/1993 | (EP) | A23L/3/005 |
| 91/11467 | * 8/1991 | (WO) . | |

* cited by examiner

*Primary Examiner*—Susan W. Berman
(74) *Attorney, Agent, or Firm*—Timothy J. Troy

(57) ABSTRACT

This invention relates to a radiation curable silicone coating composition comprising an alkoxylated resin-polymer organosilicone network containing radiation curable functionality and a cationic photoinitiator. The radiation curable silicone compositions of this invention are useful as fast curing low and high release coating compositions which are especially suitable for release of pressure sensitive adhesives.

45 Claims, No Drawings

RADIATION CURABLE SILICONE COMPOSITIONS

FIELD OF THE INVENTION

This invention relates to a radiation curable silicone composition comprising an alkoxylated resin-polymer organosilicone network containing radiation curable functionality and a cationic photoinitiator. The radiation curable silicone compositions of this invention are useful as fast curing low and high release coating compositions which are especially suitable for release of pressure sensitive adhesives.

BACKGROUND OF THE INVENTION

Epoxy functional silicone polymers capable of cationic cure either by photoinitiators or thermal initiators have been known in the art for some time. For example, Eckberg et al. in U.S. Pat. No. 4,279,717 discloses an ultraviolet-curable coating composition comprising (a) a precrosslinked epoxy functional dialkylepoxy-chainstopped polydialkyl-alkylepoxysiloxane copolymer fluid, and (b) a bis-aryl iodonium salt which is effective for catalyzing an ultraviolet light initiated cure reaction of the polydiorganosiloxane silicone intermediate fluid, which renders surfaces non-adherent to other surfaces which would normally adhere thereto, and which cures to a final non-adherent state upon brief exposure to ultraviolet radiation. Eckberg et al. further disclose that the adhesion of the coating composition to a substrate can be improved with the addition of β-(3,4-epoxycyclohexyl) ethyltrimethoxy silane.

Koshar et al. in U.S. Pat. No. 4,313,988 discloses a crosslinked, polymeric network reaction product of starting materials comprising a curable epoxy-polysiloxane and optionally an epoxy-terminated silane, said materials are cured in the presence of a catalytically effective amount of an epoxy curing catalyst, which is useful as release coatings for adhesive roll and sheet materials.

Eckberg et al. in U.S. Pat. No. 4,421,904 discloses an ultraviolet curable epoxy functional silicone intermediate fluid composition comprising a pre-crosslinked epoxy functional dialkylepoxy-chainstopped polydialkyl-alkylepoxysiloxane copolymer silicone fluid which comprises the reaction product of: (a) a vinyl- or allylic-functional epoxide, (b) a vinyl functional siloxane crosslinking fluid, (c) a hydrogen functional siloxane precursor fluid, and (d) an effective amount of precious metal catalyst for facilitating an addition cure hydrosilation reaction between components (a), (b), and (c).

Kessel et al. in U.S. Pat. No. 4,822,687 discloses a composite structure comprising a substrate bearing on one or more surfaces a layer comprising an epoxypolysiloxane in which greater than 20% of the siloxane units are substituted by an oxiranyl group-substituted monovalent, non-cyclic, linear or branched aliphatic group, the epoxypolysiloxane being free of epoxy containing cycloaliphatic group-substituted siloxane units. Kessel et al. further discloses that the composite structures can be adhesive roll and sheet materials in which the novel layer is a release coating.

Eckberg in U.S. Pat. No. 4,987,158 discloses an ultraviolet radiation-curable composition comprising: (A) a pre-crosslinked epoxy-functional diorganopolysiloxane and (B) a catalytic amount of an onium salt photocatalyst or a combination of onium salt photocatalysts which are useful as conformal coatings, optical fiber coatings, and electrical encapsulation.

Eckberg et al. in U.S. Pat. No. 5,397,813 discloses an ultraviolet curable silicone coating composition comprising: (a) a polydialkyl-alkylepoxysiloxane fluid, (b) a pre-crosslinked dialkylepoxysiloxy- or trialkylsiloxy-chainstopped polydialkyl-alkylepoxysiloxane fluid, and (c) an effective amount of a bis-(dodecylphenyl) iodonium salt photocatalyst, the photocatalytic salt being selected from the salts of the group of acids consisting of hexafluoroantimonic acid, hexafluoroarsenic acid, hexafluorophosphoric acid, and tetrafluoroboric acid. Eckberg et al. further discloses that the silicone coating compositions of this invention are suitable as low release silicone coatings.

Eckberg et al. in U.S. Pat. No. 5,360,833 discloses an ultraviolet radiation-curable epoxysilicone composition comprising a blend of epoxy-functional silicone resins and epoxy-stopped silicone fluids which in the presence of an efficacious amount of onium photocatalyst is curable when exposed to ultraviolet radiation, the blend comprising: (A) about 60% by weight epoxy-functional silicone resin, the resin containing Q groups, epoxy functional M groups and at least one member selected from D groups and T groups, wherein the resin comprises at least 5 parts of the sum of M groups and epoxy-functional M groups per 10 parts of the sum of Q groups, D groups, and T groups; and (B) about 40% by weight epoxy-stopped silicone fluids containing epoxy-functional M groups, and the blend having an epoxy equivalent weight of greater than 1000.

Kobayashi et al. in U.S. Pat. No. 5,198,476 discloses an ultraviolet-curable silicone composition comprising (A) 100 parts by weight of an epoxy-functional polyorganosiloxane which comprises structural units represented by the formula $R^1R^2SiO$, wherein $R^1$ represents a hydrogen atom or a monovalent hydrocarbon group and $R^2$ represents a hydrogen atom, a monovalent hydrocarbon group, or a monovalent epoxy-functional organic group, and in which at least two of all the organic groups are a monovalent epoxy-functional organic group, (B) from 1 to 80 parts by weight of at least one copolymer for regulating peel strength, which is soluble in component (A), selected from the group consisting of (i) a copolymer represented by a unit structure of MQ or $M^AQ$, (ii) a copolymer represented by a unit structure of $M^AT$, $MT^A$ or $M^AT^A$, and (iii) a copolymer represented by a unit structure of $M^ADQ$, $MD^AQ$, or $M^AD^AQ$, wherein M represents an $R^3{}_3SiO_{1/2}$ unit, MA represents an $R^3{}_2R^4SiO_{1/2}$ unit, D represents an $R^3{}_2SiO_{1/2}$ unit, DA represents an $R^3R^4SiO$ unit, T represents an $R^3SiO_{3/2}$ unit, TA represents an $R^4SiO_{3/2}$ unit, and Q represents an $SiO_2$ unit, wherein $R^3$ is a monovalent hydrocarbon group containing no alkenyl group and $R^4$ is an alkenyl group, and (C) a catalytically effective amount of an onium salt as a photoinitiator.

Riding in U.S. Pat. No. 5,158,991 discloses a method for increasing the release force of an ultraviolet curable epoxy functional polydiorganosiloxane release composition comprising (A) an epoxy functional diorganopolysiloxane and (B) a catalytic amount of a photocatalyst or a combination of photocatalysts comprising (i) contacting (A) and (B) with from about 1% to about 30% by weight based on (A) of (C) a siloxane resin comprising monovalent $R_3{}^2SiO_{1/2}$ and $R^3R_2{}^2SiO_{1/2}$ units and tetravalent $SiO_{4/2}$ units, the ratio of the monovalent units to tetravalent units being from about 0.6:1 to about 1.1:1, wherein $R^2$ individually is a monovalent hydrocarbon radical of no more than 2 carbon atoms, $R^3$ is a monovalent epoxy functional organic radical of from about 2 to about 20 carbon atoms, and the $R^3R_2{}^2SiO_{1/2}$ units comprising from about 1% to about 90% of the total number of monovalent units present, and (ii) dispersing components (A), (B), and (C) in (D) a hydrocarbon solvent in an amount sufficient to provide the composition with a solids content of from about 10 to about 50% by weight and a solvent content of from about 50 to about 90% by weight, the percentages being based on the total weight of Components (B), (C), and (D).

Riding in U.S. Pat. No. 5,310,601 discloses an improved ultraviolet radiation-curable epoxyfunctional silicone controlled release composition, comprising: (A) an epoxyfunctional diorganopolysiloxane having the general formula

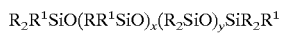

wherein R is individually a lower alkyl radical having from 1 to about 8 carbon atoms; $R^1$ individually is a monovalent cycloaliphatic epoxy-functional organic radical having from 2 to about 20 carbon atoms, "x" is a number ranging from about 1 to about 50, and "y" is a number ranging from about 1 to about 1000, (B) a catalytic amount of a photocatalyst or a combination of photocatalysts, and (C) from about 1% to about 30% by weight based on (A) of a siloxane resin comprising monovalent $R_3^2SiO_{1/2}$ and $R^3R_2^2SiO_{1/2}$ units and tetravalent $SiO_{4/2}$ units, the ratio of the monovalent units to tetravalent units being from about 0.6:1 to about 1.1:1; wherein $R^2$ individually is a monovalent hydrocarbon radical of no more than 2 carbon atoms, $R^3$ is a monovalent epoxy functional organic radical of from about 2 to about 20 carbon atoms, and the $R^3R_2^2SiO_{1/2}$ units comprising from about 1% to about 90% of the total number of monovalent units present.

Eckberg in U.S. Pat. No. 5,369,205 discloses a UV curable epoxysilicone polymer comprising: the reaction product of a linear low molecular weight SiH containing fluid of the formula $MD^H_xD_yM$ where M is $R_3SiO_{1/2}$, $D^H$ is $R(H)SiO_{2/2}$ D is $R_2SiO_{2/2}$x ranges from about 2 to about 50, y ranges from about 5 to about 500, and R is an aliphatic or aromatic radical and a $M^{Vi}MQ$ or $M^{Vi}MTQ$ resin having a ratio of M:Q of about 0.3:1.0 to about 2.5:1 and wherein the total weight % vinyl is about 0.5 to about 5.0 based on the weight of resin resulting in a hydrosilation partial reaction product and which hydrosilation partial reaction product is then reacted by hydrosilation with an epoxy containing unsaturated compound selected from aliphatic or cyclo aliphatic epoxies, said reaction product being an epoxy-functional silicone bearing pendant silicone Q resin moieties.

SUMMARY OF THE INVENTION

This invention relates to radiation curable silicone compositions comprising an alkoxylated resin-polymer organosilicone network containing radiation curable functionality, and a cationic photoinitiator.

It is an object of this invention to produce radiation curable silicone compositions which are usefull as release coating compositions.

It is an object of this invention to produce radiation curable silicone compositions which are suitable for release of pressure sensitive adhesives.

DETAILED DESCRIPTION OF THE INVENTION

In a first embodiment, this invention relates to a radiation curable silicone composition comprising (a) at least one alkoxylated resin-polymer organosilicone network obtained by a method comprising: (I) reacting a mixture comprising: (A) a Component selected from the group consisting of (A)(i) at least one silicone polymer containing at least two hydroxy groups, (A)(ii) at least one organic polymer containing at least two hydroxy groups, and (A)(iii) a mixture of (A)(i) and (A)(ii), (B) an MQ organosilicone resin, (C) at least one alkoxysilane containing at least one radiation curable group, and (D) a catalytic amount of a basic catalyst, and (II) adding (E) a neutralizing agent to the product of (I); and (b) a cationic photoinitiator. As used herein, the term "resin-polymer" describes a silicone composition wherein the molecular structure is arranged in both a three dimensional network and contains linear structure, and denotes a globular resin species wherein hydric polymeric species are attached to either form a graft or link to an adjacent resin particle.

"Reacting" for the purposes of this invention denotes simply mixing the ingredients including and any optional ingredients, or heating a mixture of the ingredients and any optional ingredients at temperatures above room temperature, preferably at temperatures above 50° C., and more preferably at temperatures from 50–150° C.

The silicone polymer of Component (A)(i) contains at least 2 hydroxy groups, but can contain 3 hydroxy groups (a triol) or more, and can be linear, branched, cyclic, and combinations thereof with a linear structure being preferred. Component (A)(i) is preferably a hydroxy-terminatedpolydiorganosiloxane. The organo substituentis a monovalent hydrocarbon group having from 1 to 20 carbon atoms and the viscosity of the hydroxy-terminated polydiorganosiloxane is typically from 10 to 60,000 mm²/s. The monovalent hydrocarbon group is exemplified by alkyl groups such as methyl, ethyl, propyl, butyl, hexyl, octyl, and decyl, cycloaliphatic groups such as cyclohexyl, aryl groups such as phenyl, tolyl, and xylyl, aralkyl groups such as benzyl and phenylethyl, and olefinic hydrocarbon groups such as vinyl, allyl, methallyl, butenyl, and hexenyl, octenyl, cyclohexenyl and styryl. Alkenyl groups are preferably terminally unsaturated. It is highly preferred that the organo substituent is methyl. The monovalent hydrocarbon group can also be any monovalent hydrocarbon group noted above which has at least one of its hydrogen atoms replaced with a halogen, such as fluorine, chlorine, or bromine, and these monovalent hydrocarbon groups, are exemplified by $CF_3CH_2CH_2$- and $C_4F_9CH_2CH_2$-. Each organo substituent can be the same or different, as desired. Preferably, Component (A)(i) is a hydroxy-terminated polydimethylsiloxane having the formula HO—$(Me_2SiO)_n$—H wherein Me denotes methyl and n has a value such that the viscosity of the hydroxy-terminated polydimethylsiloxane is from 10 to 60,000 mm²/s.

A combination of two or more different types of silicone polymers containing at least two —OH groups can also be used as Component (A)(i). Thus Component (A)(i) can comprise a combination of at least 2 hydroxy-terminated polydimethylsiloxanes having viscosities of from 10 to 60,000 mm²/s. When a combination of two or more hydroxy-terminated polydimethylsiloxanes are used, they may be in the form of a mixture or may be included as separate components.

The organic polymer of Component (A)(ii) contains at least 2 hydroxy groups, but can contain 3 hydroxy groups (a triol) or more, and can be linear, branched, cyclic, and combinations thereof with a linear structure being preferred. Component (A)(ii) is exemplified by polybutylene glycol, polypropylene glycol, polyethylene glycol-propylene glycol copolymers, and polyethylene glycol-polybutylene glycol copolymers. Preferably, Component (A)(ii) is polybutylene glycol.

Component (A) can also be a mixture of (A)(i) and (A)(ii). The silicone polymers of (A)(i) and organic polymers of (A)(ii) are as described hereinabove including preferred embodiments thereof. If a mixture of (A)(i) and (A)(ii) it can be used generally used in a weight ratio of (A)(i) to (A)(ii) of from 1:99 to 99:1, depending on the ultimate application.

For purposes of this invention, from 1 to 99 wt % of Component (A) can be used, and it is highly preferred that from 10 to 90 wt % be used, said wt % being based on the total weight of the formulation.

The silicone resins of Component (B) are macromolecular polymers consisting essentially of $R_3SiO_{1/2}$ and $SiO_{4/2}$ siloxy units, wherein R is a functional or nonfunctional organic group. Such units are conventionally called M and Q units, respectively. Those skilled in the art will appreciate that such resins may also include a limited number of $R_2SiO_{2/2}$ and $RSiO_{3/2}$ siloxy units, conventionally referred to as D and T units, respectively. Generally speaking, the term "MQ resin" is used to describe organosilicone resins wherein the quantity of T and D units does not, on average, exceed 20 mole percent. Thus, organosilicone resins that primarily consist essentially of M and Q units are frequently referred to as MQ resins.

In the method of the invention, preferably Component (B) is an MQ organosilicone resin having the empirical formula $$[R_3SiO_{1/2}]_a[R_2SiO_{2/2}]_b[RSiO_{3/2}]_c[SiO_{4/2}]_d$$

wherein each R is independently a methyl group or a hydroxyl group, and a, b, c, and d are zero or positive numerical values with the provisos that a+b+c+d=1, $0 \leq (b+c) \leq 0.2$ and the ratio of a:(b+c+d) is from about 0.3:1 to about 1:1.

As previously mentioned, MQ resins may contain a limited number of D and T units. Thus, the value of parameters a, b, c and d are limited as set forth above such that the number of D and T units does not exceed 20 percent of the number of siloxy units.

Furthermore, the above limitations dictate that the number of M units must be greater than at least 0.3 of the sum of the number of D, T and Q units. The ratio of M units to the sum of D, T and Q units is inversely proportional to the molecular weight of the resin. Thus, when the ratio of M:(D+T+Q) is greater than about 1:1, the MQ resin behaves more as a liquid than a solid. Hence, when that ratio is in excess of 1:1, Mn of the resin is generally less than about 2,200. Conversely, when that ratio is less than about 0.3, Mn generally exceeds about 7,700 and the resin looses its solubility in aromatic solvents.

For purposes of this invention, from 1 to 99 wt % of the MQ organosilicone resin (B) can be used, preferably from 1 to 40 wt % be used, and it is highly preferred that from 5 to 25 wt % be used, said wt % being based on the total weight of the formulation.

Component (C) of the invention is at least one alkoxysilane containing at least one radiation curable group. The alkoxysilane is exemplified by a compound having the empirical formula $$R^1_xSi(OR^2)_{(4-x)}$$

wherein x is 1, 2 or 3, $R^1$ is independently selected from the group consisting of alkyl groups and a radiation curable group selected from the group consisting of epoxy groups, acryloxy groups, and methacryloxy groups, and $R^2$ is an alkyl group having from 1 to 6 carbon atoms with the proviso that at least one $R^1$ is a radiation curable group.

Because of availability, cost and reactivity, methoxy silanes and ethoxy silanes are the most preferred.

It is important to note that Component (C) does not include tetra alkoxysilanes. It was found that when a pure tetra alkoxysilane, such as tetra methoxy silane, was reacted with the MQ resins of Component (B) in the presence of (D) a basic catalyst, the system had a tendency to produce an intractable precipitate. It is speculated that the use of tetra alkoxysilanes promotes intermolecular condensation and linkage, leading to insoluble high molecular weights. Those skilled in the art will recognize, however, that the use of a limited amount of a tetra alkoxysilane in combination with either mono-, di-, or trialkoxysilanes is not specifically excluded in the practice of the present invention, except to the extent that such inclusion leads to an unacceptable quantity of intractable precipitate.

Preferably x has a value of 1. The alkyl groups of $R^1$ are exemplified by methyl, ethyl, propyl, butyl, pentyl, hexyl, octyl, decyl, dodecyl, and octadecyl.

The epoxy groups of $R^1$ are exemplified by 1,2-epoxyethyl, 2,3-epoxypropyl, 3,4-epoxybutyl, 5,6-epoxyhexyl, 9,10-epoxydecyl, glycidoxymethyl, alpha-glycidoxyethyl, beta-glycidoxyethyl, alpha-glycidoxypropyl, beta-glycidoxypropyl, gamma-glycidoxypropyl, 2-(3,4-epoxycyclohexyl)ethyl, 3-(3,4-epoxycyclohexyl)propyl, and 3,4-epoxycyclohexylbutyl.

The acryloxy groups of $R^1$ are exemplified by gamma-acryloxymethyl, gamma-acryloxyethyl, and gamma-acryloxypropyl.

The methacryloxy groups of $R^1$ are exemplified by gamma-methacryloxymethyl, gamma-methacryloxyethyl, and gamma-methacryloxypropyl, with gamma-acryloxypropyl and gamma-methacryloxypropyl being preferred.

The alkyl groups of $R^2$ are exemplified by methyl, ethyl, propyl, butyl, pentyl, and hexyl, with methyl being preferred.

Particularly preferred alkoxysilanes for Component (C) include glycidoxymethyltriethoxysilane, alpha-glycidoxyethyl trimethoxysilane, alpha-glycidoxyethyltriethoxysilane, beta-glycidoxyethyltrimethoxysilane, beta-glycidoxyethyltriethoxysilane, alpha-glycidoxypropyltrimethoxysilane, alpha-glycidoxypropyltriethoxysilane, beta-glycidoxypropyltrimethoxysilane, beta-glycidoxypropyltriethoxysilane, gamma-glycidoxypropyltrimethoxysilane, gamma-glycidoxypropylmethyldimethoxysilane, gamma-glycidoxypropyldimethylethoxysilane, and 2-(3,4-epoxycyclohexyl)ethyltrimethoxysilane, with gamma-glycidoxypropyltrimethoxysilane, and 2-(3,4-epoxycyclohexyl)ethyltrimethoxysilane being preferred, and 2-(3,4-epoxycyclohexyl)ethyltrimethoxysilane being especially preferred.

For purposes of this invention from 1 to 99 wt % of the alkoxysilane (C) can be used, and it is highly preferred that from 5 to 30 wt % be used, said wt % being based on the total weight of the formulation.

Component (D) of the invention comprises a catalytic amount of a basic catalyst. Suitable basic catalysts include but are not limited to NaOH, KOH, $NaOCH_3$, LiOH, potassium tertiary butoxide, $LiOCH_3$, $KOCH_3$, sodium silanolate, and amines such as ethanolamine, tetrabutylammonium fluoride. It should be noted that amines will serve to catalyze the reaction of the invention, but at a considerably slower rate when compared to the remaining aforementioned basic catalysts.

As used herein, the term "catalytic amount" is such an amount of catalyst that causes the reaction of the invention to proceed at a predetermined desired rate. The catalytic amount of catalyst will, of course, depend upon the type of basic catalyst, as some are more effective than others. It is preferred for purposes of this invention that from 0.001 to 10.0 wt % of the basic catalyst (D) be used, and it is highly preferred that from 0.01 to 1.0 wt % be used, said wt % being based on the total weight of the formulation.

In the preferred embodiment of the invention, the reacting step (I) is carried out under conditions of reflux. While it is known that the reaction will proceed at room temperature conditions, it is well-known in the art that reaction rates are accelerated at elevated temperatures. The MQ resin, as dissolved in an aromatic solvent, may be directly reacted. In one embodiment of the invention, a volatiles trap is employed which then substantially separates the aromatic solvent and alcohols (whether intentionally introduced or generated during reaction) from the alkoxylated resin.

The neutralizing step (II) is easily carried out by the addition of (E) a neutralizing agent such as an acid, exemplified by solid carbon dioxide or acetic acid, to the reaction mixture, after step (I). Solid carbon dioxide is particularly useful in this regard as any excess will simply leave the reaction mixture in the form of vapor. Other useful neutralizing agents include acetic acid and chlorosilanes. A sufficient amount of Component (E), the neutralizing agent, must be added to insure the base is completely neutralized. Generally, a 100% excess of neutralizing agent, preferably acetic acid, is added.

The mixture of step (I) can further comprise (F) an alkyl functional alkoxysilane. Particularly preferred alkyl functional alkoxysilanes are exemplified by methyltrimethoxysilane and dimethyldimethoxysilane, with methyltrimethoxysilane being especially preferred.

For purposes of this invention, preferably from 1 to 50 weight parts of the alkyl functional alkoxysilane be used per 100 weight parts of Components (A)+(B)+(C)+(D)+(E), and it is highly preferred that from 10 to 30 weight parts be used per 100 weight parts of Components (A)+(B)+(C)+(D)+(E).

The mixture of step (I) can further comprise (G) water. Preferably the water is distilled water. For purposes of this invention, preferably from 1 to 10 weight parts of water be used per 100 weight parts of Components (A)+(B)+(C)+(D)+(E).

When Component (C) is an epoxy functional alkoxysilane, the method of this invention can further comprise reacting the product of (II) with a mixture comprising (H) an organic acid exemplified by unsaturated carboxylic acids such as acrylic acid, methacrylic acid, itaconic acid, maleic acid, furmaric acid, and (J) a basic catalyst as described above, including preferred embodiments thereof. This mixture can further comprise a solvent such as toluene, and a stabilizer such as phenothiazine. Preferably Component (H) is acrylic acid or methacrylic acid. Preferably, Component (H) is present in the mixture from 1 to 10 weight parts per 100 parts of the product of (II), and Component (J) is present in the mixture from 0.01 to 10 weight parts per 100 weight parts of the product of (II) preferably about 1 parts per 100 parts of the product of (II).

Component (a) can also be a combination of two or more different alkoxylated resin-polymer organosilicone networks, where the second alkoxylated resin-polymer organosilicone network differs in the type of components used, or differs in the weight ratio of ingredients used to prepare the formulation.

It is preferred for purposes of this invention that from 95 to 99.9 wt % of the alkoxylated resin-polymer organosilicone network (a) be used, and it is highly preferred that from 99 to 99.5 wt % be used, said wt % being based on the total weight of the radiation curable silicone composition.

Component (b) in the compositions of this invention is cationic photoinitiator. Suitable cationic photoinitiators are selected from the group consisting of onium salts, diaryliodonium salts of sulfonic acids, triarylsulfonium salts of sulfonic acids, diaryliodonium salts of boronic acids, and triarylsulfonium salts of boronic acids.

The onium salts are preferably selected from the group consisting of $R^3_2I^+MX_n^-$, $R^3_3S^+MX_n^-$, $R^3_3Se^+MX_n^-$, $R^3_4P^+MX_n^-$, and $R^3_4N^+MX_n^-$, wherein each $R^3$ is an organic group having from 1 to 30 carbon atoms exemplified by aromatic carbocyclic groups having from 6 to 20 carbon atoms. Each $R^3$ can be substituted with from 1 to 4 monovalent hydrocarbon groups exemplified by alkoxy groups having from 1 to 8 carbon atoms, alkyl groups having from 1 to 8 carbon atoms, nitro, chloro, bromo, cyano, carboxyl, mercapto, and aromatic heterocyclic groups exemplified by pyridyl, thiophenyl, and pyranyl. The symbol M in the formulae hereinabove are metals or metalloids which include transition metals exemplified by Sb, Fe, Sn, Bi, Al, Ga, In, Ti, Zr, Sc, V, Cr, Mn, Cs, rare earth metals exemplified by lanthanides, for example, Cd, Pr, and Nd, and metalloids exemplified by B, P, and As. $MX_n^-$ is a non-basic, non-nucleophilic anion exemplified by $BF_4^-$, $PF_6^-$, $AsF_6^-$, $SbF_6^-$, $SbCl_6^-$, $HSO_4^-$, $ClO_4^-$, $FeCl_4^=$, $SnCl_6^=$, and $BiCl_5^=$.

Preferred onium salts are exemplified by bis-diaryl iodonium salts, for example, bis(dodecyl phenyl) iodonium hexafluoroarsenate, bis(dodecylphenyl) iodonium hexafluoroantimonate, and dialkylphenyl iodonium hexafluoroantimonate.

Diaryliodonium salts of sulfonic acids, triarylsulfonium salts of sulfonic acids, diaryliodonium salts of boronic acids, and triarylsulfonium salts of boronic acids are also suitable as the cationic photoinitiator (b). Preferred diaryliodonium salts of sulfonic acid are diaryliodonium salts of perfluoroalkylsulfonic acids and diaryliodonium salts of aryl sulfonic acids. Preferred diaryliodonium salts of perfluoroalkylsulfonic acids are exemplified by diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethane sulfonic acid. Preferred diaryliodonium salts of aryl sulfonic acids are exemplified by diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid are triarylsulfonium salts of perfluoroalkylsulfonic acids and triarylsulfonium salts of aryl sulfonic acids. Preferred triarylsulfonium salts of perfluoroalkylsulfonic acids are exemplified by triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids are exemplified by triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid. Preferred diaryliodonium salts of boronic acids, and triarylsulfonium salts of boronic acids are compounds such as those disclosed in European Patent Application No. 0562922. Preferred diaryliodonium salts of boronic acids include diaryliodonium salts of perhaloarylboronic acids and preferred triarylsulfonium salts of boronic acids are the triarylsulfonium salts of perhaloarylboronic acid.

Preferably component (b) is selected from the group consisting of bis(dodecyl phenyl) iodonium hexafluoroarsenate, bis(dodecylphenyl) iodonium hexafluoroantimonate, and dialkylphenyl iodonium hexafluoroantimonate, with bis(dodecylphenyl) iodonium hexafluoroantimonate being especially preferred.

Preferably the amount of cationic photoinitiator (b) is from 0.1 to 5 wt % based on the total weight of the composition, and it is highly preferred to use from 0.5 to 1 wt % based on the total weight of the radiation curable silicone composition.

The radiation curable silicone compositions of this invention can further comprise (c) a free radical photoinitiator. The free radical photoinitiator can be any benzoin exemplified by benzoin alkyl ethers, acetophenones exemplified by dialkoxyacetophenones, dichloroacetophenones, and trichloroacetophenones, benzils exemplfied by benzil ketals, quinones, and O-acylated-α-oximinoketones. Preferably the free radical photoinitiator is a compound having the formula

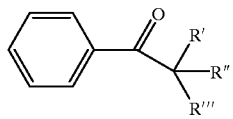

wherein R' is selected from the group consisting of —H, an alkoxy group, and a halogen atom, R" is selected from the group consisting of —OH, an alkoxy group, and a halogen atom, and R'" is selected from the group consisting of —H, an alkyl group, and a halogen atom. Preferred embodiments of this compound are (i) where R' is —H, R" is —OH and R'" is methyl or phenyl, (ii) where R' is —H, R" is an alkoxy group and R'" is phenyl (for benzoin alkyl ethers), (iii) where both R' and R" are alkoxy groups and R'" is phenyl (for benzil ketals), (iv) where both R' and R" are alkoxy groups and R'" is —H (for dialkoxyacetophenones), and (v) where both R' and R" are —Cl and R'" is —Cl or —H (for di- and tri- chloroacetophenones). It is especially preferred for the compositions that the free radical photoinitiator is DAROCURE® 1173 (2-hydroxy-2-methyl-1-phenyl-propan-1-one).

Preferably the amount of free radical photoinitiator is from 0.01 to 5 weight parts per 100 weight parts of Components (a)+(b), it is highly preferred to use from 0.5 to 1 weight parts per 100 weight parts of Components (a)+(b).

The radiation curable silicone compositions of this invention can also further comprise (d) sensitizers exemplified by thioxanthones such as 2-chlorothioxanthone, 4-chlorothioxanthone, 2-isopropylthioxanthone, 4-isopropylthioxanthone, 2-methylthioxanthone, 2-decylthioxanthone and 2-dodecylthioxanthone. These can be made in known ways and also are available from commercial sources. Preferred is 2-isopropylthioxanthone.

Preferably the amount of sensitizer is from 0.001 to 2 weight parts per 100 weight parts of Components (a)+(b), it is highly preferred to use from 0.01 to 0.1 weight parts per 100 weight parts of Components (a)+(b).

In a second embodiment, this invention also relates to a radiation curable silicone composition comprising (a') at least one alkoxylated resin-polymer organosilicone network obtained by a method comprising: (I) reacting a mixture comprising: (A) a Component selected from the group consisting of (A)(i) at least one silicone polymer containing at least two hydroxy groups, (A)(ii) at least one organic polymer containing at least two hydroxy groups, and (A)(iii) a mixture of (A)(i) and (A)(ii), (B) an MQ organosilicone resin, (C) at least one alkyl functional alkoxysilane, and (D) a catalytic amount of a basic catalyst, (II) adding (E) a neutralizing agent to the product of (I); (III) reacting the product of (II) with (F) a mono-organic alcohol containing at least one radiation curable group in the presence of (G) a transesterification catalyst; and (b') a cationic photoinitiator.

Components (A), (B), (D), (E), and cationic photoinitiator are as described hereinabove including preferred embodiments and amounts thereof.

Component (C) the alkyl functional alkoxysilane is exemplified by a compound having the empirical formula

wherein x is 1, 2 or 3, $R^1$ is independently an alkyl group, and $R^2$ is an alkyl group having from 1 to 6 carbon atoms. Because of availability, cost and reactivity, methoxy silanes and ethoxy silanes are the most preferred.

It is important to note that Component (C) does not include tetra alkoxysilanes. It was found that when a pure tetra alkoxysilane, such as tetra methoxy silane, was reacted with the MQ resins of Component (B) in the presence of (D) a basic catalyst, the system had a tendency to produce an intractable precipitate. It is speculated that the use of tetra alkoxysilanes promotes intermolecular condensation and linkage, lead to insoluble high molecular weights. Those skilled in the art will recognize, however, that the use of a limited amount of a tetra alkoxysilane in combination with either mono-, di-, or trialkoxysilanes is not specifically excluded in the practice of the present invention, except to the extent that such inclusion leads to an unacceptable quantity of intractable precipitate.

The alkyl groups of $R^1$ are exemplified by methyl, ethyl, propyl, butyl, pentyl, hexyl, octyl, decyl, dodecyl, and octadecyl.

Particularly preferred alkoxysilanes for Component (C) include methyltrimethoxysilane and dimethyldimethoxysilane. Component (C) can also be a combination of two or more of any of the above described alkyl functional alkoxysilanes. Preferred combinations are exemplified by a combination of methyltrimethoxysilane and dimethyldimethoxysilane.

For purposes of this invention from 1 to 99 wt % of the alkoxysilane (C) can be used, and it is highly preferred that from 5 to 30 wt % be used, said wt % being based on the total weight of the formulation.

The radiation curable mono-organic alcohol (F) is exemplified by hydroxyalkylvinylethers and hydroxyalkylacrylates. The hydroxyalkylvinylethers are exemplified by hydroxyethylvinylethers, hydroxybutylvinylethers, and hydroxymethylcyclohexylvinylethers, and the hydroxyalkylacrylates are exemplified by hydroxymethacrylates, hydroxyethylacrylates, hydroxyethylmethacrylates, hydroxypropylacrylates, hydroxypropylmethacrylates, propylene glycol monomethacrylates, and hydroxybutylacrylates. Preferably the mono-organic alcohol is selected from the group consisting of 4-hydroxybutylvinylether and 4-hydroxybutylacrylate, with 4-hydroxybutylvinylether being especially preferred.

The transesterification catalyst (G) is preferably selected from the group consisting of organotin compounds, organotitanate compounds, and chelated titanium compounds. The organotin compounds are exemplified by stannous carboxylates and diorganotin dicarboxylates. The stannous carboxylates are exemplified by stannous octoate, stannous 2-ethylhexoate, stannous neodecanoate, stannous isooctanoate, stannous isodecanoate, and stannous 2,2-dimethyldecanoate. The diorganotin dicarboxylates are exemplified by dibutyltin diacetate, dibutyltin dilaurate, dibutyltin dioctoate, and dimethyltin dilaurate.

The organotitanate compounds are exemplified by tetraalkyltitanates such as tetrabutyltitanate, tetraisopropyltitanate, tetramethyltitanate, and tetraoctyltitanate.

The chelated titanium compounds are exemplified diisopropoxy titanium bis-(ethylacetoacetonate), diisopropoxy titanium bis-(methyl acetoacetonate), diisopropoxy titanium bis-(acetylacetonate), dibutoxy titanium bis-(ethyl acetoacetonate), and dimethoxy titanium bis-(methyl acetoacetonate). Preferably the transesterification catalyst is a tetraalkyltitanate, and especially preferred is tetrabutyltitanate.

The radiation curable mono-organic alcohol (F) can be part of the mixture of Step (I), or can be added after Step (I) but before the transesterification catalyst (G), or can be added after adding the transesterification catalyst, or can be added as a mixture of transesterification catalyst and radiation curable mono-organic alcohol.

For purposes of this invention from 5 to 50 wt % of the radiation curable mono-organic alcohol (F) can be used, and it is highly preferred that from 10 to 30 wt % be used, said wt % being based on the total weight of the formulation.

For purposes of this invention from 0.0001 to 5 wt % of the transesterification catalyst (G) can be used, and it is highly preferred that from 0.01 to 1 wt % be used, said wt % being based on the total weight of the formulation.

The radiation curable silicone compositions in the second embodiment of this invention can further comprise (c) a free radical photoinitiator. The free radical photoinitiator is as described above including preferred embodiments and amounts thereof.

The radiation curable silicone compositions in the second embodiment of this invention can also further comprise (d) a sensitizer. The sensitizer is as described above including preferred embodiments and amounts thereof.

The radiation curable silicone compositions of this invention can also contain ingredients exemplified by reinforcing and extending fillers, hydrocarbons and halohydrocarbons, colorants, dyes, preservatives, fragrances, stabilizers, adhesion modifiers, or diluents.

The radiation curable silicone compositions of this invention can be prepared by mixing the materials described hereinabove and any optional components in any order, using any suitable mixing means, such as a spatula, a drum roller, a mechanical stirrer, a three-roll mill, a sigma blade mixer, a bread dough mixer, or a two-roll mill.

The present invention further relates to a method of making an article of manufacture comprising (I) applying a radiation curable silicone composition comprising Components (a) and (b) and any optional ingredients, or a radiation curable silicone composition comprising Components (a') and (b') and any optional ingredients, all of which are described hereinabove, to a solid substrate to form a coating, and (II) exposing the coating to an energy source selected from the group consisting of (i) actinic radiation and (ii) actinic radiation in combination with heat in an amount sufficient to cure the coating.

The coating may be applied by any suitable manner known in the art, such as by spreading, brushing, extruding, spraying, gravure, kiss-roll and air-knife.

In a preferred embodiment, the solid substrate is a flexible sheet material such as paper, polyolefin film, polyolefin-coated paper, or foil. Other suitable solid substrates that can be coated by the method of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form, the solid substrate can be substantially sheet-like, such as a peelable release liner for pressure sensitive adhesive; a fabric or a foil; or substantially three-dimensional in form.

By actinic radiation it is meant ultraviolet light; electron beam radiation; or alpha-, beta-, gamma- or x-rays. By heat it is meant infrared radiation, hot-air, microwave radiation, etc. Of course actinic radiation is frequently accompanied by heat and the use of a combination of the two falls within the scope and spirit of the present invention. Herein the term "cure", as applied to the composition and method of this invention, generally denotes a chemical change which leads to a change in the state of the composition from a liquid to a solid. Curing itself may be achieved in any of the known ways, including passing a coated substrate under the desired source of radiation, for example a UV lamp, at a predetermined rate and exposing a completely coated substrate to radiation by switching on the required energy source for a predetermined time.

In a preferred embodiment, a flexible sheet material, such as paper, metal foil or tapestock, is coated with a thin coating of the radiation curable silicone composition, preferably in a continuous manner, and the thus-coated material is then heated and/or irradiated to rapidly cure the coating, to provide a sheetlike material bearing on at least one surface thereof an adhesive-releasing coating. The adhesive-releasing coating is subsequently brought into contact with an adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The adhesive can be a non-silicone-based pressure sensitive adhesive such as the well-known acrylic or rubber types or a silicone-based pressure sensitive adhesive such as the peroxide- or platinum-curable polydiorganosiloxane-based adhesives. The adhesive can also be those used in foods, asphalt, and gum polymers. The compositions of the present invention are useful as release coatings for pressure sensitive adhesives, as protective coatings and decorative coatings.

In the examples hereinbelow, all amounts (parts and percentages) are by weight unless otherwise indicated.

EXAMPLES

In the Examples hereinbelow:

Polymer 1 denotes a hydroxy-terminated polydimethylsiloxane having a viscosity of 55,000 $mm^2/s$.

Polymer 2 denotes a hydroxy-terminated polydimethylsiloxane having a viscosity of 5,000 $mm^2/s$.

Polymer 3 denotes a hydroxy-terminated polydimethylsiloxane having a viscosity of 2,000 $mm^2/s$.

Polymer 4 denotes a hydroxy-terminated polydimethylsiloxane having a viscosity of 13,500 $mm^2/s$.

Polymer 5 denotes a hydroxy-terminated polydimethylsiloxane having a viscosity of 75 $mm^2/s$.

Polymer 6 denotes a hydroxy-terminated polydimethylsiloxane having a viscosity of 41 $mm^2/s$.

MQ Resin denotes a 74 wt % xylene solution of an MQ organosilicone resin consisting essentially of $(CH_3)_3SiO_{1/2}$ units (M units) and $SiO_2$ units (Q units) in a molar ratio of about 0.75:1.

Epoxysilane 1 denotes 2-(3,4-epoxycyclohexyl)-ethyltrimethoxysilane (Silquest™ A 186 Silane available from OSi Specialties, Danbury, Conn.).
Epoxysilane 2 denotes gamma-glycidoxypropyltrimethoxysilane.
MTM denotes methyltrimethoxysilane.
NaOMe denotes sodium methoxide.

Cure was determined in the following manner: Samples for UV cure were combined with 2 wt % of UV 9380C (bis(dodecylphenyl)iodonium hexafluoroantimonate from General Electric Company, Silicone Products Division, Waterford, N.Y.) and coated at approximately 1 lb/ream on Mylar film. Cure was monitored by NNN (no smear, no rub off, no transfer to adhesive). As the surface chemistries of different grades of plastic films have a profound effect on the ability of a coating to adhere, as is being measured in the rub off test of NNN, failure to adhere was noted, but not used as a measure of cure. Samples were cured on a conveyer passing under a 300 watt H bulb. Cure was reported as the maximum speed at which NN was achievable, i.e. 30 to 512 ft/min.

Release values were determined in the following manner: The radiation curable silicone compositions were each coated onto biaxially oriented polypropylene and cured by exposure to a Fusion UV Processor equipped with an H-bulb with an irradiating power of 600 watts/in$^2$. The coated films were aged at room temperature for 1 day, then laminated with an acrylic based tape, Tesa® 7475. The laminates were aged at room temperature for the time indicated prior to determining the release force. Release forces were measured at various peel speeds at a 180° peel angle.

Example 1

A series of eight experiments were run varying only the amount of water added. About 90 g of Polymer 5, 19 g of Epoxysilane 1, 1.2 g of 25 wt % NaOMe in methanol, and an amount in g of water as defined in Table 1 were combined in a round bottom flask with condenser and warmed to 80° C. for 30 minutes, at which point 15 g of MQ resin was added. The mixture was heated a further 4 hours at 80° C., then the base was neutralized with 0.6 g of acetic acid. The neutralized fluid was stripped at 1 50° C. and 5 mmHg pressure for 1 hour. The cure and release force results are shown in Table 1 below.

TABLE 1

| Sample # | H2O (g) | Viscosity (mm$^2$/s) | Cure: Speed/Wattage | Release: g/in at 400 ipm |
|---|---|---|---|---|
| 1 | 0 | 79 | 340/300 | 21 |
| 2 | .25 | 147 | 456/300 | 35 |
| 3 | .5 | 223 | 512/300 | 38 |
| 4 | .75 | 300 | 340/300 | 38 |
| 5 | 1 | 563 | 416/300 | 29 |
| 6 | 1.25 | gelled | NA | NA |
| 7 | 1.5 | gelled | NA | NA |
| 8 | 1.75 | gelled | NA | NA |

Example 2

About 60 g of MQ resin, 60 g of Polymer 6, 80 g of Epoxysilane 2, and 4 g of 25 wt % NaOMe in methanol were combined in a closed vessel and left to react 16 hours at room temperature. The reactions were completed by heating the mixture to 70° C. for 1 hour then neutralizing it with 2.4 g of acetic acid. Next, the mixture was stripped of volatiles with a rotovap at 150° C. and 5 mm Hg pressure. The filtered fluid did not cure immediately at 50 ft/min at 600 watts but did post cure within 1 minute.

Example 3

About 1200 g of Polymer 5, 147.6 g of Epoxysilane 2, and 14 g of 25 wt % NaOMe in methanol were combined and allow to react at room temperature for 16 hours. Next, the mixture was neutralized with 7 g of acetic acid and volatiles were removed by stripping the mixture on a rotovap at 150° C. and 5 mm Hg. Next, a 100 g aliquot of this stripped reaction mixture, 92 g of MQ resin, 2 g of Epoxysilane 2, and 1 g of NaOMe solution were combined. Next, the mixture was heated to 75° C. for four hours then neutralized with 1 g of acetic acid., and rotovaped at 150° C. and 5 mmHg. The product had a viscosity of 7000 mm$^2$/s fluid and produced a cure speed of 50 ft/min at 600 watts.

Example 4

Two series of experiments were run in which the only two variables were the amount of water of hydrolysis added and the order of addition of MQ resin. In Series A, Samples 1–4, about 90 g of Polymer 5, 20 g of Epoxysilane 1, 1.2 g of 25 wt % NaOMe in methanol, and 15 g of MQ resin were combined with an amount of water in g as defined in Table 2, in a round bottom flask with condenser and warmed to 80° C. for 4 hours. The reacted materials were neutralized with 0.6 g of acetic acid and vacuum stripped at 150° C. and 5 mm Hg on a rotovap. In series B, Samples 5–8, the identical compositions to series A where used except this time MQ resin was excluded until such time as the polymer, silane, water and catalyst had 30 minutes of pre-reaction to give a partially hydrolysed silane capped polymer which consequently took part in the digestion of the resin. In series A the hydrolysis, capping and digestion are in direct competition and an average structure is obtained, as judged by the cure speeds, release levels and viscosity. In series B greater control over ultimate viscosity is possible. The results are shown in Table 2 below.

TABLE 2

| Sample # | H2O (g) | Viscosity (mm$^2$/s) | Cure: Speed/Wattage | Release: g/in at 400 ipm |
|---|---|---|---|---|
| 1 | 0 | 286 | 512/300 | 19 |
| 2 | 0.25 | 319 | 512/300 | 21 |
| 3 | 0.50 | 302 | 231/300 | 27 |
| 4 | 0.75 | 261 | 512/300 | 20 |
| 5 | 0 | 86 | 512/300 | 24 |
| 6 | 0.25 | 123 | 512/300 | 25 |
| 7 | 0.50 | 163 | 512/300 | 22 |
| 8 | 0.75 | 376 | 416/300 | 31 |

Example 5

In the following series of experiments higher resin levels result in high release values, but the ultimate viscosity of the fluid is controlled by prehydrolysing varying levels of Epoxysilane 1 in the presence of: 90 g of Polymer 5, 1.2 g of 25 wt % NaOMe in methanol, and x g of water (see Table 3) at 80° C. for 30 minutes, then adding 45 g of MQ resin and heating to 80° C. for another 4 hours. The reacted materials were neutralized with 0.6 g of acetic acid and vacuum stripped at 150° C. and 5 mm Hg on a rotovap.

TABLE 3

| Sample # | H2O (g) | Viscosity (mm²/s) | Cure: Speed/Wattage | Release: g/in at 400 ipm |
|---|---|---|---|---|
| 1 | 0.7 | 409 | 110/300 | 88 |
| 2 | 1.2 | 417 | 293/300 | 45 |
| 3 | 1.8 | 1471 | 340/300 | 42 |
| 4 | 2.3 | 2476 | 231/300 | 57 |

In a round bottom flask with condenser, 20 g of Epoxysilane 1, 15 g of MQ resin, 0.1 g of 25 wt % of NaOMe in methanol, and 90 g of a mixture of two hydroxy-terminated polydimethylsiloxanes. The mixture of was a mixture of Polymers 4 and 5, which are higher molecular weight polymers (see Table 4). The clear solutions were then warmed to 80° C. for 4 hours. The base was neutralized with 0.25 g of acetic acid and vacuum stripped at 150° C. and 5 mm Hg on a rotovap. The results are shown in Table 4 below.

TABLE 4

| Polymer A | Polymer B | Cure: Speed/Wattage | Release: g/in at 400 ipm |
|---|---|---|---|
| 90 g Polymer 5 | | 452/300 | 18 |
| 80 g Polymer 5 | 10 g Polymer 3 | 126/300 | 20 |
| 80 g Polymer 5 | 10 g Polymer 4 | 126/300 | 21 |
| 80 g Polymer 5 | 10 g Polymer 1 | 90/300 | 22 |
| 80 g Polymer 5 | 10 g Polymer 2 | 90/600 | 22 |

Example 6

An epoxy functional resin-polymer organosilicone network was produced by mixing 15 g of MQ Resin, 23 g of Epoxysilane 1, 80 g of Polymer 5, 10 g of Polymer 6, and 2 g of 25% NaOMe in methanol to a 3 necked round bottom flask equipped with a stirrer and reflux condenser. The mixture was heated at 80° C. for 4 hours prior to the addition of 1 g of acetic acid. The liquid was then filtered and stripped at 150° C. for 1 hour at 5 mm Hg. The viscosity of the final product was 193 mm²/s.

An acrylate composition was prepared by mixing 100 g of the organosilicone network prepared above with 10 g of acrylic acid, and 1 g of tetramethylguanidine(TMGA). This mixture was heated in 100 g of toluene for 16 hours at 100° C. The sample gelled.

A second acrylate composition was prepared by using trifluoromethane sulfonic acid as a catalyst instead of TMGA. An acrylate composition was prepared by mixing 100 g of the organosilicone network prepared above with 5 g of acrylic acid and 0.1 g of trifluoromethane sulfonic acid then heating this mixture at 80° C. for 16 hours. This sample also resulted in a gel.

A silicone acrylate was obtained by mixing 100 g of the organosilicone network prepared above with 5 g of acrylic acid, and 0.1 g of tetrabutylammonium fluoride (catalyst) in 100 g of toluene containing 200 ppm of phenothiazine (a stabilizer for acrylates) in methanol. The mixture was heated at 80° C. for 16 hours, prior to stripping on a rotovap at 80° C. and 10 mm Hg. Next, a radiation curable silicone composition containing 98 wt % of the silicone acrylate prepared above and 2 wt % Darocure® 1173 (2-hydroxy-2-methyl-1-phenyl-propan-1-one from Ciba Geigy, Terrytown, N.Y.) was cured to a solid coating on a paper substrate when passed beneath a Fusion H bulb UV lamp.

Example 7

Materials suitable for radiation curing where prepared via two distinct methods. In Examples 7A, 7B, and 7C, at least one hydroxyl-terminated polydimethylsiloxane polymer, MQ Resin, MTM, and 0.2 pts NaOMe in methanol were heated at 80° C. for 3 hours. The resulting resin-polymer network was neutralized with 0.1 parts of acetic acid. The methoxy functionality on the resin polymer network was then reacted in a transesterification reaction with HBVE (hydroxybutylvinylether) using 100 ppm tetrabutyl titanate (TBT). Example 7D is distinct in that at least one hydroxyl-terminated polydimethylsiloxane polymer, MQ Resin, MTM, and HBVE where combined in one pot and 0.1 parts of NaOMe in methanol was used to both digest the resin, condense the SiOH, and transestesterify the alcohol. All samples were vacuum stripped to greater than 98.5% non volatile content at 150° C. and 5 mm Hg vacuum. The amount of MQ Resin, MTM, Polymer type, Polymer amount, and HBVE amount are shown in Table 5 hereinbelow.

TABLE 5

| Example | MQ Resin (g) | MTM (g) | Polymer types | Polymer (g) | HBVE (g) | Sequential |
|---|---|---|---|---|---|---|
| 7A | 50 | 100 | Polymer 3 | 100 | 50 | YES |
| 7B | 25 | 100 | Polymers 5/6 | 100/100 | 50 | YES |
| 7C | 50 | 100 | Polymer 3/6 | 10/90 | 50 | YES |
| 7D | 50 | 100 | Polymer 5/6 | 50/50 | 50 | NO |

That which is claimed is:

1. A radiation curable silicone composition comprising:
   (a) at least one alkoxylated resin-polymer organosilicone network obtained by a method comprising:
      (I) reacting a mixture comprising:
         (A) a Component selected from the group consisting of:
            (A)(i) at least one silicone polymer containing at least two hydroxy groups;
            (A)(ii) at least one organic polymer containing at least two hydroxy groups; and
            (A)(iii) a mixture of (A)(i) and (A)(ii);
         (B) an MQ organosilicone resin;
         (C) at least one alkoxysilane containing at least one radiation curable group; and
         (D) a catalytic amount of a basic catalyst; and
      (II) adding (E) a neutralizing agent to the product of (I); and
   (b) a cationic photoinitiator.

2. A composition according to claim 1, wherein Component (A) is Component (A)(i) and Component (A)(i) is at least one hydroxy-terminated polydimethylsiloxane having the formula HO—(Me$_2$SiO)$_n$—H wherein Me denotes methyl and n has a value such that the viscosity of the hydroxy-terminated polydimethylsiloxane is from 10 to 60,000 mm²/s.

3. A composition according to claim 1, wherein (B) is an MQ organosilicone resin having the empirical formula

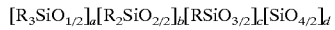

wherein each R is independently a methyl group or a hydroxyl group, and a, b, c, and d are zero or positive numerical values with the provisos that a+b+c+d=1, 0≦(b+c)≦0.2 and the ratio of a:(b+c+d) is from about 0.3:1 to about 1:1.

4. A composition according to claim 2, wherein (B) is an MQ organosilicone resin having the empirical formula

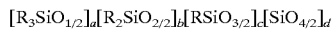

wherein each R is independently a methyl group or a hydroxyl group, and a, b, c, and d are zero or positive numerical values with the provisos that a+b+c+d=1, 0<(b+c)≦0.2 and the ratio of a:(b+c+d) is from about 0.3:1 to about 1:1.

5. A composition according to claim 1, wherein (C) is a compound having the empirical formula

wherein x is 1, 2 or 3, $R^1$ is independently selected from the group consisting of alkyl groups and a radiation curable group selected from the group consisting of epoxy groups, acryloxy groups, and methacryloxy groups, and $R^2$ is an alkyl group having from 1 to 6 carbon atoms with the proviso that at least one $R^1$ is a radiation curable group.

6. A composition according to claim 5, wherein x has a value of 1, the alkyl groups are selected from the group consisting of methyl, ethyl, propyl, butyl, pentyl, hexyl, octyl, decyl, dodecyl, and octadecyl, $R^1$ is an epoxy group, and $R^2$ is selected from the group consisting of methyl and ethyl.

7. A composition according to claim 4, wherein (C) is selected from the group consisting of glycidoxymethyltriethoxysilane, alpha-glycidoxyethyl trimethoxysilane, alpha-glycidoxyethyltriethoxysilane, beta-glycidoxyethyltrimethoxysilane, beta-glycidoxyethyltriethoxysilane, alpha-glycidoxypropyltrimethoxysilane, alpha-glycidoxypropyltriethoxysilane, beta-glycidoxypropyltrimethoxysilane, beta-glycidoxypropyltriethoxysilane, gamma-glycidoxypropyltrimethoxysilane, gamma-glycidoxypropylmethyldimethoxysilane, gamma-glycidoxypropyldimethylethoxysilane, and 2-(3,4-epoxycyclohexyl)ethyltrimethoxysilane.

8. A composition according to claim 7, wherein (C) is 2-(3,4-epoxycyclohexyl)ethyltrimethoxysilane.

9. A composition according to claim 1, wherein (D) is selected from the group consisting of NaOH, KOH, $NaOCH_3$, LiOH, potassium tertiary butoxide, $LiOCH_3$, $KOCH_3$, sodium silanolate, ethanolamine, and tetrabutylammonium fluoride.

10. A composition according to claim 7, wherein (D) is selected from the group consisting of NaOH, KOH, $NaOCH_3$, LiOH, potassium tertiary butoxide, $LiOCH_3$, $KOCH_3$, sodium silanolate, ethanolamine, and tetrabutylammonium fluoride.

11. A composition according to claim 8, wherein (D) is $NaOCH_3$.

12. A composition according to claim 1, wherein (E) is selected from the group consisting of acetic acid and solid carbon dioxide.

13. A composition according to claim 10, wherein (E) is selected from the group consisting of acetic acid and solid carbon dioxide.

14. A composition according to claim 11, wherein (E) is solid carbon dioxide.

15. A composition according to claim 1, wherein the mixture of step (I) further comprises (F) an alkyl functional alkoxysilane.

16. A composition according to claim 13, wherein the mixture of Step (I) further comprises (F) an alkyl functional alkoxysilane selected from the group consisting of methyltrimethoxysilane and dimethyldimethoxysilane.

17. A composition according to claim 14, wherein the mixture of Step (I) further comprises (F) methyltrimethoxysilane.

18. A composition according to claim 1, wherein the mixture of step (I) further comprises (G) water.

19. A composition according to claim 13, wherein the mixture of step (I further comprises (G) water.

20. A composition according to claim 14, wherein the mixture of step (I) further comprises (G) water.

21. A composition according to claim 16, wherein the mixture of step (I) further comprises (G) water.

22. A composition according to claim 17, wherein the mixture of step (I) further comprises (G) water.

23. A composition according to claim 6, wherein Component (a) is obtained by a method comprising reacting the product of (II) with a mixture comprising (H) an organic acid and (J) a basic catalyst.

24. A composition according to claim 23, wherein (H) is selected from the group consisting of acrylic acid and methacrylic acid and (J) is tetrabutylammonium fluoride.

25. A composition according to claim 1, wherein (b) is bis(dodecylphenyl) iodonium hexafluoroantimonate.

26. A composition according to claim 13, wherein (b) is bis(dodecylphenyl) iodonium hexafluoroantimonate.

27. A composition according to claim 14, wherein (b) is bis(dodecylphenyl) iodonium hexafluoroantimonate.

28. A composition according to claim 17, wherein (b) is bis(dodecylphenyl) iodonium hexafluoroantimonate.

29. A composition according to claim 22, wherein (b) is bis(dodecylphenyl) iodonium hexafluoroantimonate.

30. A composition according to claim 1, wherein the composition further comprises (c) a free radical photoinitiator.

31. A composition according to claim 1, wherein the composition further comprises a sensitizer.

32. A composition according to claim 26, wherein the composition further comprises (d) a sensitizer.

33. A composition according to claim 27, wherein the composition further comprises 2-isopropylthioxanthone.

34. A composition according to claim 28, wherein the composition further comprises 2-isopropylthioxanthone.

35. A composition according to claim 29, wherein the composition further comprises 2-isopropylthioxanthone.

36. A radiation curable silicone composition comprising:
 (a') at least one alkoxylated resin-polymer organosilicone network obtained by a method comprising:
  (I) reacting a mixture comprising:
   (A) a Component selected from the group consisting of
    (A)(i) at least one silicone polymer containing at least two hydroxy groups,
    (A)(ii) at least one organic polymer containing at least two hydroxy groups, and (A)(iii) a mixture of (A)(i) and (A)(ii);
   (B) an MQ organosilicone resin;
   (C) at least one alkyl functional alkoxysilane; and
   (D) a catalytic amount of a basic catalyst;
  (II) adding (E) a neutralizing agent to the product of (I); and
  (III) reacting the product of (II) with (F) a monoorganic alcohol containing at least one radiation curable group in the presence of (G) a transesterification catalyst; and
 (b') a cationic photoinitiator.

37. A composition according to claim 36, wherein (C) is methyltrimethoxysilane.

38. A composition according to claim 36, wherein (F) is selected from the group consisting of 4-hydroxybutylvinylether and 4-hydroxybutylacrylate.

39. A composition according to claim 37, wherein (F) is selected from the group consisting of 4-hydroxybutylvinylether and 4-hydroxybutylacrylate.

40. A composition according to claim 36, wherein (G) is tetrabutyltitanate.

41. A composition according to claim 39, wherein (G) is tetrabutyltitanate.

42. A composition according to claim 36, wherein the composition further comprises (c') a free radical photoinitiator.

43. A composition according to claim 41, wherein the composition further comprises (c') a free radical photoinitiator.

44. A method of making an article of manufacture comprising:
(I) applying a radiation curable silicone composition comprising:
(a) at least one alkoxylated resin-polymer organosilicone network obtained by a method comprising:
(I) reacting a mixture comprising:
(A) a Component selected from the group consisting of:
(A)(i) at least one silicone polymer containing at least two hydroxy groups;
(A)(ii) at least one organic polymer containing at least two hydroxy groups; and
(A)(iii) a mixture of (A)(i) and (A)(ii);
(B) an MQ organosilicone resin;
(C) at least one alkoxysilane containing at least one radiation curable group; and
(D) a catalytic amount of a basic catalyst; and
(II) adding (E) a neutralizing agent to the product of (I); and (b) a cationic photoinitiator to a solid substrate to form a coating; and
(II) exposing the coating to an energy source selected from the group consisting of (i) actinic radiation and (ii) actinic radiation in combination with heat in an amount sufficient to cure the coating.

45. A method of making an article of manufacture comprising:
(I) applying a radiation curable silicone composition comprising:
(a') at least one alkoxylated resin-polymer organosilicone network obtained by a method comprising:
(I) reacting a mixture comprising:
(A) a Component selected from the group consisting of
(A)(i) at least one silicone polymer containing at least two hydroxy groups,
(A)(ii) at least one organic polymer containing at least two hydroxy groups, and (A)(iii) a mixture of (A)(i) and (A)(ii);
(B) an MQ organosilicone resin;
(C) at least one alkyl functional alkoxysilane; and
(D) a catalytic amount of a basic catalyst;
(II) adding (E) a neutralizing agent to the product of (I); and
(III) reacting the product of (II) with (F) a monoorganic alcohol containing at least one radiation curable group in the presence of (G) a transesterification catalyst; and (b') a cationic photoinitiator. to a solid substrate to form a coating; and
(II) exposing the coating to an energy source selected from the group consisting of (i) actinic radiation and (ii) actinic radiation in combination with heat in an amount sufficient to cure the coating.

* * * * *